United States Patent
Yamanaka

[19]

[11] Patent Number: 5,953,298
[45] Date of Patent: Sep. 14, 1999

[54] FOCUSED SPOT POSITION-DISCRIMINATING SYSTEM AND OPTICAL DISK WITH GUIDING GROOVE SUITED THEREFOR

[75] Inventor: Yutaka Yamanaka, Tokyo, Japan

[73] Assignee: NEC Corporation, Tokyo, Japan

[21] Appl. No.: 08/966,480

[22] Filed: Nov. 7, 1997

[30] Foreign Application Priority Data

Nov. 7, 1996 [JP] Japan .................................. 8-294833

[51] Int. Cl.⁶ ...................................................... G11B 7/00
[52] U.S. Cl. .......................................................... 369/54
[58] Field of Search .............................. 369/44.26, 44.27, 369/44.29, 54, 58

[56] References Cited

U.S. PATENT DOCUMENTS

| | | | |
|---|---|---|---|
| 5,245,598 | 9/1993 | Burroughs | 369/54 X |
| 5,414,451 | 5/1995 | Sugiyama et al. | |
| 5,537,373 | 7/1996 | Horikiri | 369/44.13 |

FOREIGN PATENT DOCUMENTS

| | | |
|---|---|---|
| 0626679 | 11/1994 | European Pat. Off. . |
| 0751504 | 1/1997 | European Pat. Off. . |
| 4-19831 | 1/1992 | Japan . |

OTHER PUBLICATIONS

Patent Abstracts of Japan, vol. 096, No. 004, Apr. 30, 1996, for JP 7–320285.

Patent Abstracts of Japan, vol. 096, No. 10, Oct. 31, 1996, for JP 8–167147.

*Primary Examiner*—W. R. Young
*Attorney, Agent, or Firm*—Sughrue, Mion, Zinn, Macpeak & Seas, PLLC

[57] ABSTRACT

It is an object of the invention to provide a focussed spot position-discriminating system and an optical disk with a guiding groove suited therefor. A laser light emitted from a laser light source is focussed on the optical disk with the guiding groove by an objective lens. The servo control circuit of a servo control system for controlling the position of the objective lens discriminates whether the focussed spot is on a land track or a groove track based on the offset of the focussing error signal. The depth of the guiding groove is selected to be $\lambda/8$ to $\lambda/6$ in order to obtain nearly the maximum offset of the focussing error signal.

2 Claims, 6 Drawing Sheets

FOCUSED SPOT POSITION-DISCRIMINATING SYSTEM AND OPTICAL DISK WITH GUIDING GROOVE SUITED THEREFOR

FIELD OF THE INVENTION

The invention relates to a focussed spot position-discriminating system and an optical disk with a guiding groove suited therefor, and especially relates to a focussed spot position-discriminating system, which discriminates whether the focussed spot is on a land track or a groove track based on a focussing error signal of a servo control system of an optical head apparatus, and the optical disk with the guiding groove, the depth of which is so selected that the offset of the focussing error signal becomes nearly the maximum.

BACKGROUND OF THE INVENTION

In an optical disk called rewritable disk, guided groove is provided thereon, a focussed light spot is guided along this guide and optical data is recorded and reproduced on the optical disk.

The surface of the rewritable optical disk is divided in two regions, one is a groove track, and the other is a land track. The groove track means the top surface of the guiding groove, and the land track means a bottom surface between the adjacent guiding grooves. In the rewritable disk, the information is recorded on any one of the land and groove tracks selected at will. When the information is recorded and reproduced on the groove track for an instance, an objective lens mounted on an optical head is so controlled that the spot of a laser light is in focus on the groove track and traces its center line. In order to accomplish the aforementioned servo control for the objective lens, it is indispensable to discriminate whether the focussed spot is on the land track or the groove track. In the conventional rewritable optical disk system, this discrimination is carried out by the aid of a total reflected light from the optical disk, because the total reflected light varies in a sinusoidal fashion around a certain constant as the focussed spot moves in the tracking direction, if the widths of the land and groove tracks are different from each other. In other words, the aforementioned method is not successful in case that the widths of both the land and groove tracks are the same, because the total reflected light becomes independent of the position of the focussed spot.

If the rewritable optical disk system, which can discriminate whether the focussed spot is on the land track or the groove track in case that the widths of both the land and groove tracks are the same, these tracks can be used as information-recording tracks, and data stored in the rewritable optical can be doubled.

SUMMARY OF THE INVENTION

Accordingly, it is an object of the invention to provide a focussed spot position-discriminating system applied to an optical disk with a guiding groove, which can discriminate whether a focussed spot is on a land track or a groove track based on a focussing error signal of a servo control system for controlling an objective lens, even when widths of both the land and groove tracks are nearly equal to each other.

It is a further object of the invention to provide a focussed spot position-discriminating system applied to an optical disk with a guiding groove, which can discriminate whether a focussed spot is on a land track or a groove track based on a signal for driving an objective lens in a focussing direction in a servo control system for controlling the objective lens, even when widths of both the land and groove tracks are nearly equal to each other.

It is a still further object of the invention to provide an optical disk with a guiding groove suited for the aforementioned focussed spot position-discriminating system.

According to the first feature of the invention, a focussed spot position-discriminating system comprises:

means for focussing a laser light on an optical disk provided with a guiding groove via an objective lens, means for controlling the objective lens in both focussing and tracking directions based on focussing and tracking error signals, which are derived from a reflected light from a focussed spot on the optical disk, and means for discriminating whether the focussed spot is on a land track or a groove track based on a level of the focussing error signal.

According to the second feature of the invention, a focussed spot position-discriminating system comprises:

means for focussing a laser light on an optical disk provided with a guiding groove via an objective lens, means for controlling the objective lens in both focussing and tracking directions based on focussing and tracking error signals, which are derived from a reflected light from a focussed spot on the optical disk, and means for discriminating whether the focussed spot is on a land track or a groove track based on a signal for driving the objective lens in the focussing direction in the means for controlling the objective lens.

According to the third feature of the invention, an optical disk with a guiding groove comprises:

a land track and a groove track, both having nearly equal widths, and a guiding groove having a depth being in a region $\lambda/8$ to $\lambda/6$, wherein $\lambda$ denotes a wavelength of a laser light irradiating the optical disk.

BRIEF DESCRIPTION OF THE DRAWINGS

The invention will be explained in more detail in conjunction with appended drawings, wherein.

DESCRIPTION OF THE PREFERRED EMBODIMENTS

Before explaining a focussed spot position-discriminating system and an optical disk with a guiding groove in the preferred embodiments of the invention, the aforementioned conventional system will be explained.

Figure 1:
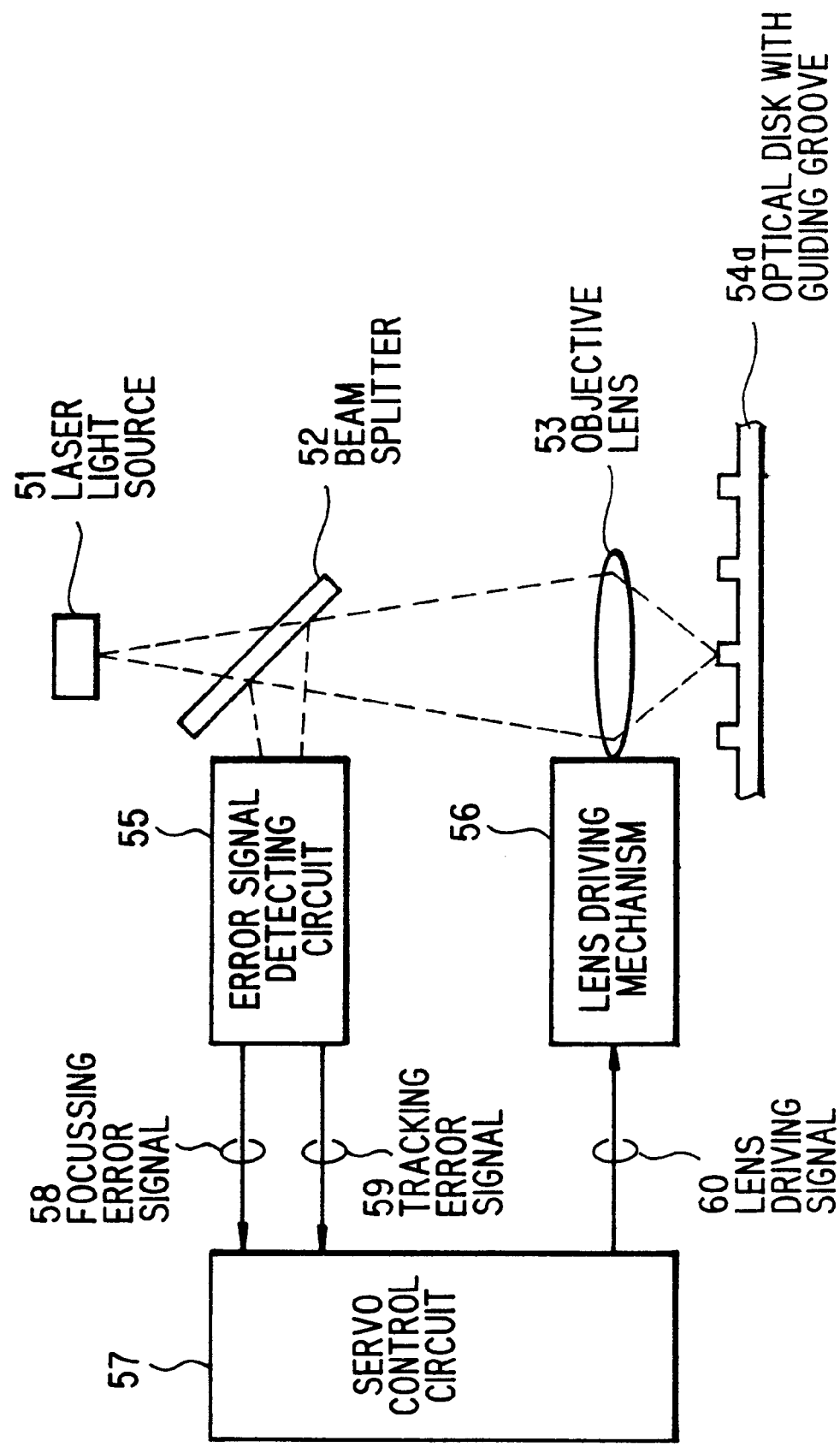
FIG. 1 is a block diagram showing a structure of a conventional focussed spot position-discriminating system.

The optical configuration of a conventional optical head apparatus used for recording and reproducing the optical data on the groove track of the rewritable optical disk is shown in FIG. 1.

In this configuration, a laser light emitted from the laser light source 51 is focussed on the optical disk 54a with the guiding groove by an objective lens 53 to form a focussed spot. A reflected light from the focussed spot is separated by a beam splitter 52 and led to an error-detecting circuit 55. In this error-detecting circuit 55, a focussing error signal 58, which corresponds to the deviation of the focussed spot in the focussing direction, and a tracking error signal 59, which corresponds to the deviation of the focussed spot in the tracking direction, are detected and supplied to a servo control circuit 57. In the aforementioned process, a knife-edge method, an astigmatic method or a spot size method is used as a method for detecting the focussing error signal. Moreover, a push-pull method is generally used as a method for detecting the tracking error signal.

In order to cope with the situation that the focussed spot deviates from its regular position, a lens-driving signal 60, which is generated based on both the focussing error signal 58 and the tracking error signal 59, is supplied to a servo control circuit 57 in order to drive the objective lens 53 in both the focussing and tracking directions and follow the deviation of the focussed spot.

Figure 2:
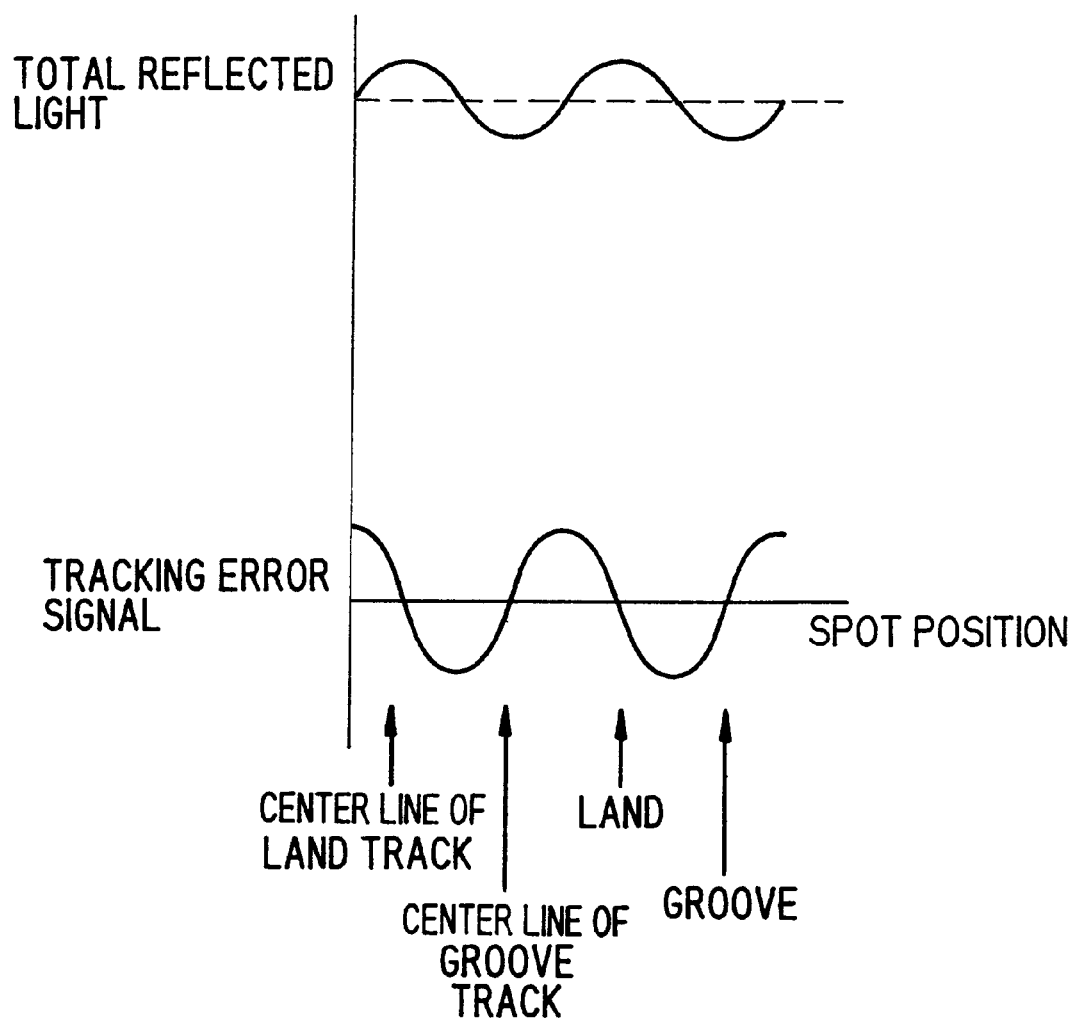
FIG. 2 shows a relation between a total reflected light from an optical disk and a position of a focussed spot in the conventional focussed spot position-discriminating system.

In order to achieve satiable servo characteristic for controlling the objective lens, it is necessary to discriminate whether the focussed spot is on a land track on a groove track, where the groove track means the top surface of the guiding groove and the land track means a bottom surface between the adjacent guiding grooves. FIG. 2 shows the values of total reflected light from the optical disk and the tracking error signal as functions of the position of the focussed spot. Since the tracking error signal becomes zero at center lines of both the land and groove tracks as shown in a lower portion of FIG. 2, the position of the focussed spot cannot be discriminated through this signal. Accordingly, in the conventional rewritable optical disk system, the position of the focussed spot is discriminated through the total reflected light from the optical disk as shown in an upper portion of FIG. 2.

However, the difference in the total reflected light from the optical disk between the land and groove tracks is observed only in case that the widths of the land and groove tracks are different from each other. In the conventional rewritable optical disk system, since any one of the land and groove tracks has been used as an information recording track, there arises no incommodity in case that the widths of the land and groove tracks are different from each other.

Recently, a proposal is made for a novel rewritable optical disk system, in which both the land and groove tracks are used as information-recording tracks, in order to increase recording density. In such a case, it becomes necessary to make the widths of both the land and groove tracks be equal to each other in order to achieve the same information-recording characteristics.

However, if the widths of the land and groove tracks are the same, the position of the focussed spot can not be discriminated by the aforementioned method, because the total reflected light from the optical disk becomes independent of the position of the focussed spot as shown by a broken line in the upper portion of FIG. 2. As mentioned in the above, the conventional rewritable optical disk system is not successful in case that the widths of both the land and groove tracks are equal to each other.

Next, the embodiments of the invention will be explained to FIGS. 3 to 7.

Figure 3:
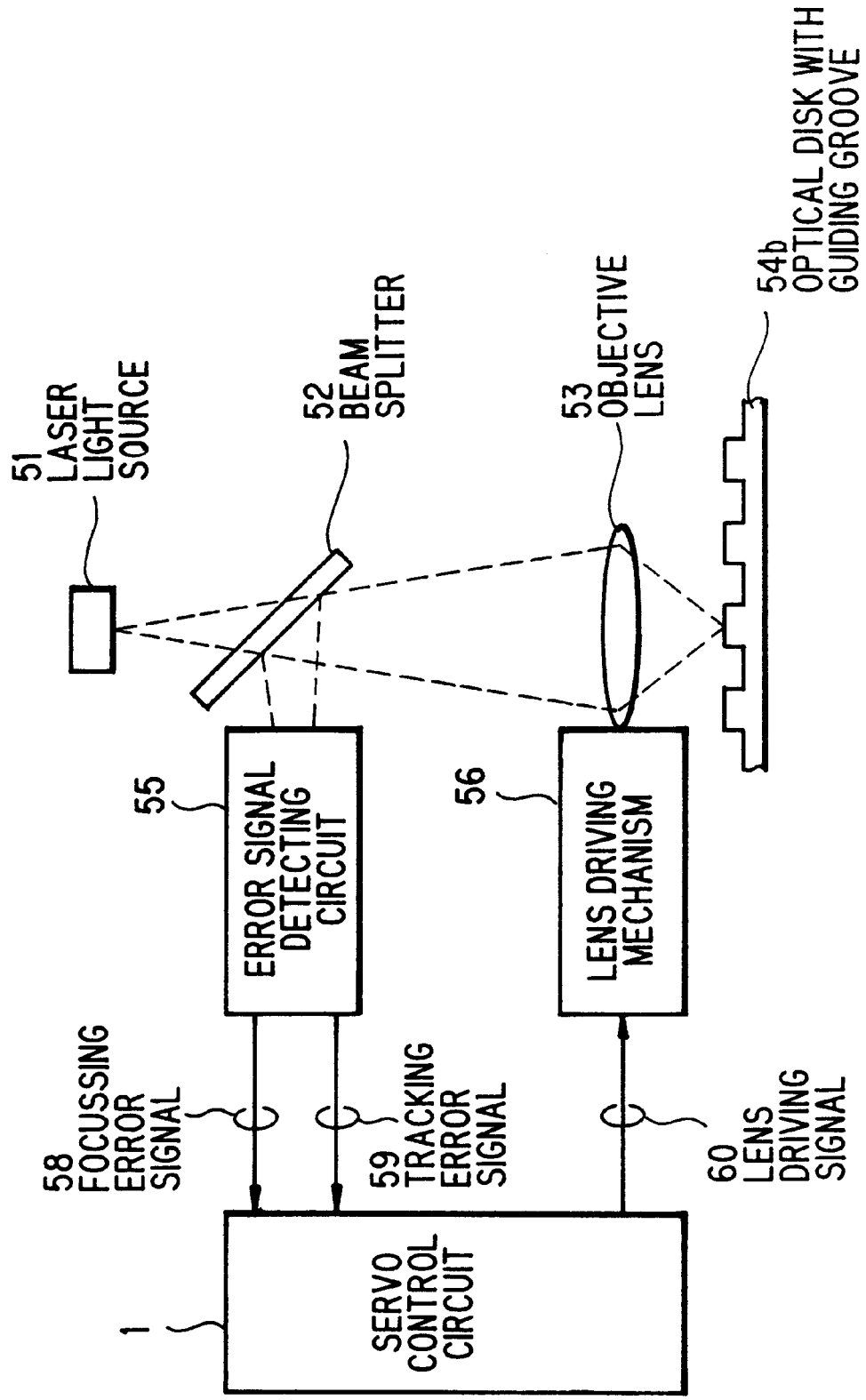
FIG. 3 is a block diagram showing a structure of a focused spot position-discriminating system according to the invention, shown as the first preferred embodiment.

FIG. 3 shows a block diagram for representing the optical configuration of an optical head apparatus according to the invention. A reference numeral 51 means a laser light source, and a beam splitter 52 and an objective lens 53, which is movable in both the focussing and tracking directions, are allocated between the laser light source 51 and an optical disk 54b with a guiding groove. A laser light emitted by the laser light source 51 is focussed on the rewritable optical disk 54b with a guiding groove by an objective lens 53. A reflected light from the optical disk 54b incidents on the beam splitter 52 via objective lens 53 and is supplied to an error signal detecting circuit 55.

The error signal-detecting circuit 55 generates a focussing error signal 58 and a tracking error signal 59 based on the incident lights thereon and supplies them to a servo control circuit 1. The servo control circuit 1 controls the position of the objective lens 53 in both the focussing and tracking directions to situate it an optimum point based on the focussing error signal 58 and the tracking error signal 59. The servo control circuit 1 generates a lens-driving signal 60 based on the focussing error signal 58 and the tracking error signal 59, and supplies it to a lens-driving mechanism 56. The lens-driving mechanism 56 is provided with an actuator for driving the objective lens 53 in the both focussing and tracking directions.

The servo control circuit 1 in this embodiment discriminates whether the focussed spot is on the land track on the groove track based on the focussing error signal 58, which is derived from the reflected light from the optical disk 54b. Explaining more concretely, the servo control circuit 1 discriminates the track, on which the focussed spot is positioned, based on the fact that the offset of the focussing error signal depends on whether the focussed spot is on the land track or the groove track. Tracking servo control of the objective lens 53 is carried out based on the aforementioned discrimination.

Figure 4:
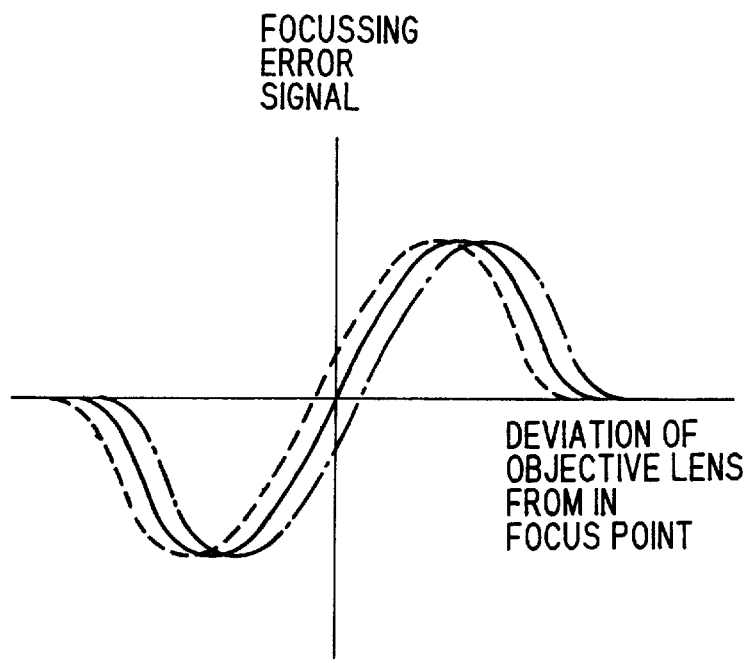
FIG. 4 shows a relation between an offset of a focussing error signal and a deviation of an objective lens from its in focus point.

According to an experimental investigation accomplished by the inventors, a relation between the focussing error signal and the deviation of the objective lens from an in focus point shows a S-curve represented by a real line in FIG. 4, when the optical disk 54b is provided with no guiding groove, and a central zero cross point corresponds to case that the spot is in focus. However, when the optical disk is provided with the guiding groove, the S-curve shifts in the right and left directions in accordance with the position of the focussed spot. When the focussed spot is on the land track, the S-curve is shifted to the left and represented by a broken line. When the focussed spot is on the groove track, the S-curve is shifted to the right and represented by a chain line. As mentioned in the above, it becomes clear that the offset of the focussing error signal arises at the in focus point.

It can be confirmed that the aforementioned property of the offset of the focussing error signal can be observed independently of the method for detecting the focussing error signal, such as a knife-edge method, a Foucault-prism method, an astigmatic method or a spot-size method. Moreover, it becomes clear that the aforementioned property can be observed in case that the widths of the land and groove tracks are either equal or not.

Figure 5:
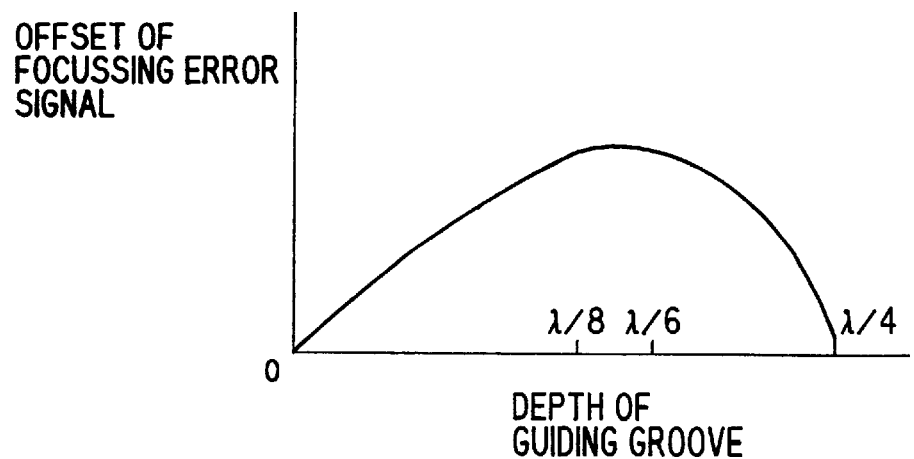
FIG. 5 shows a relation between an offset of a focussing error signal and a depth of a guiding groove of an optical disk.

The offset of the focussing signal is changed as the depth the guiding groove is changed. As shown in FIG. 5, if the wavelength of the laser light is denoted by $\lambda$, the offset of the focussing error signal becomes nearly the maximum, when the depth of the guiding groove lies in a region $\lambda/8$ to $\lambda/6$.

Accordingly, in the rewritable optical disk, in which the widths of the land and groove tracks are equal to each other, it is advisable that the depth of the guiding groove is set in the region $\lambda/8$ to $\lambda/6$.

According to the aforementioned configuration, the servo control circuit can discriminate whether the focussed spot is on the land track or the groove track based on the offset of the focussing error signal.

Figure 6:
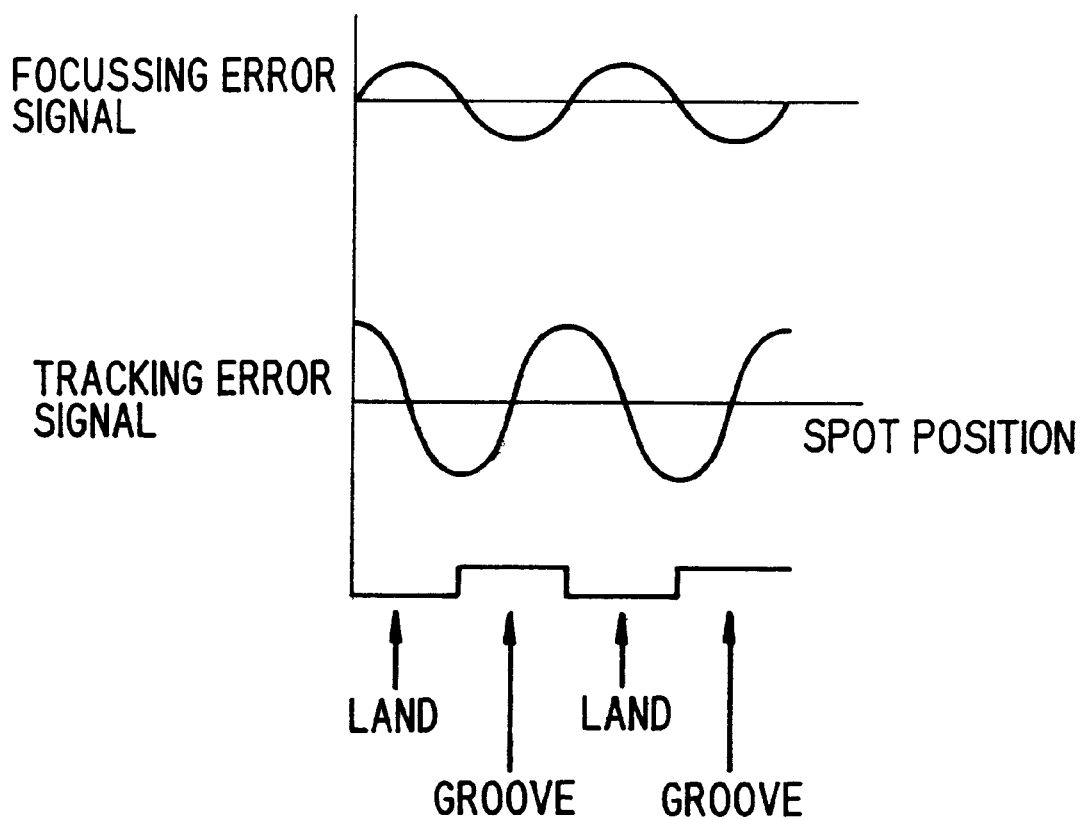
FIG. 6 shows a relation between a focussing error signal and a position of a focussed spot.

FIG. 6 shows a relation between the focussing error signal and the position of the focussed spot, when the focussed spot moves in the tracking direction. As shown in the drawing, the focussing error signal is obviously dependent on the position of the focussed spot, in other words, whether the focussed spot is on the land track or the groove track.

Next, the second preferred embodiment will be explained referring to the appended drawing.

Figure 7:
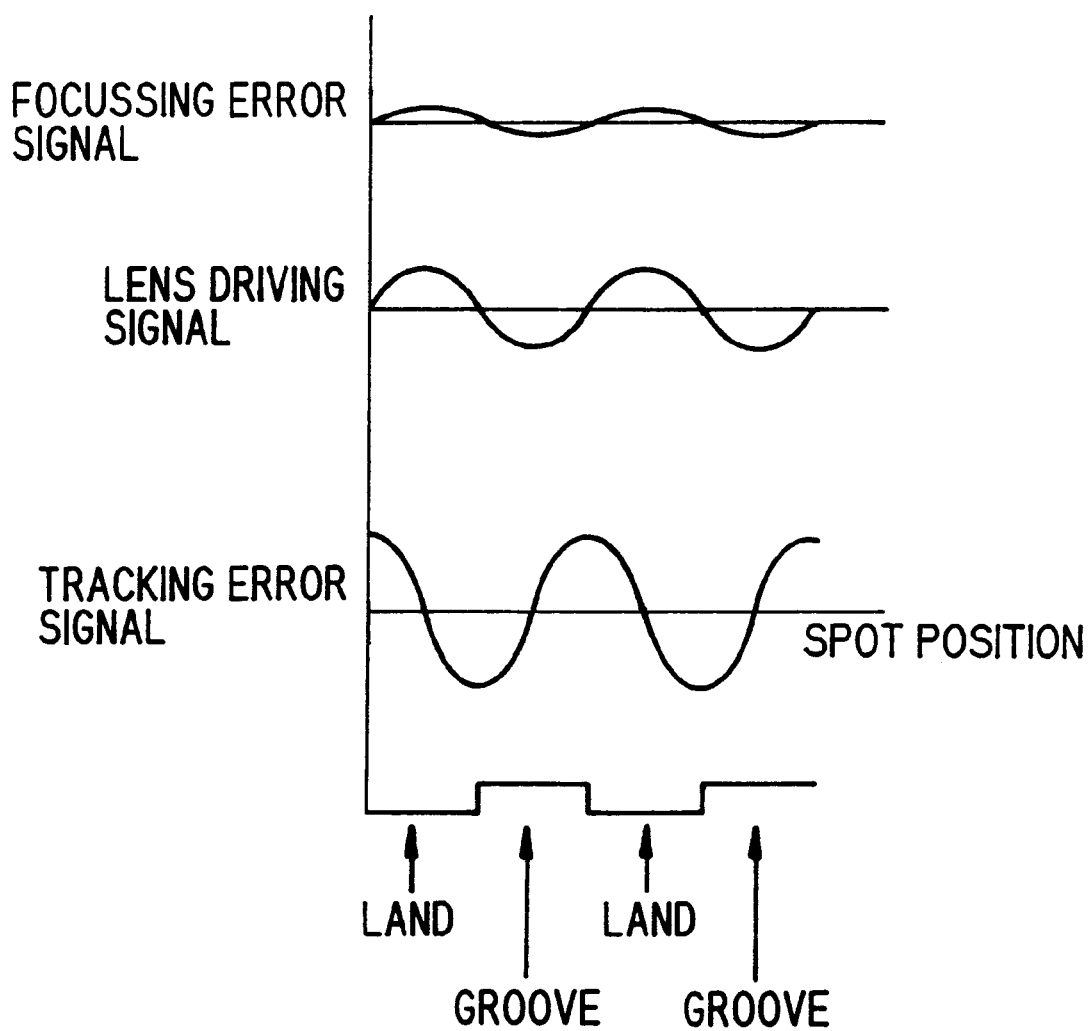
FIG. 7 shows a relation between a lens-driving signal and a position of a focussed spot.

Since the focussing error signal 58 serves as a control signal for the objective lens-driving, if frequency component of variation of the focussing error signal 58 caused by shifting of the focussed spot agrees with that of a focussing servo control system of the objective lens 53, the amplitude of the focussing error signal 58 decreases influenced by movement of the objective lens 53 as shown in FIG. 7, and it becomes difficult to discriminate whether the focussed spot is on the land track or the groove track.

In such a case, it is advisable to discriminate whether the focussed spot is on the land track or the groove track based on the lens driving signal 60. The reason is that, in the lens driving signal 60, a signal component for driving the objective lens 53 in the focussing direction is closely related to the offset of the focussing error signal 58. According to the aforementioned procedure, it becomes possible to discriminate whether the focussed spot is on the land track or the groove track, even if the amplitude of variation of the focussing error signal is small.

According to the focussed spot position-discriminating system shown in claim 1, since the servo control circuit discriminates whether the focussed spot is on the land or groove track based on the focussing error signal of the error signal detecting circuit for the objective lens-driving, the position of the focussed spot can be discriminated, even when the widths of the land and groove track are equal to each other, and a stable tracking servo control system for the objective lens can be realized.

According to the focussed spot position-discriminating system shown in claim 2, since the servo control circuit discriminates whether the focussed spot is on the land or groove track based on the lens driving signal of the servo control system for the objective lens, the stable servo control system for the objective lens can be realized, even when frequency component of vibration of the focussing error signal agrees with that of the focussing servo control system for the objective lens.

According to the optical disk with the guiding groove showing in claim 3, since the depth of the guiding groove lies in the region $\lambda/8$ to $\lambda/6$, the offset of the focussing error signal at the in focus point becomes nearly the maximum and the servo control circuit can easily discriminate whether the focussed spot is on the land or groove track. As mentioned in the above, the focussed spot position discrimination system and the optical disk suited therefor with excellent characteristics, which have never been achieved by conventional approaches, can be provided by the present invention.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A focussed spot position-discriminating system comprising:

means for focussing a laser light on an optical disk provided with a guiding groove via an objective lens, means for controlling said objective lens in both focussing and tracking directions based on focussing and tracking error signals, which are derived from a reflected light from a focussed spot on said optical disk, and means for discriminating whether said focussed spot is on a land track or a groove track based on a level of said focussing error signal.

2. A focussed spot position-discriminating system comprising:

means for focussing a laser light on an optical disk provided with a guiding groove via an objective lens, means for controlling said objective lens in both focussing and tracking directions based on focussing and tracking error signals, which are derived from a reflected light from a focussed spot on said optical disk, and means for discriminating whether said focussed spot is on a land track or a groove track based on a signal for driving said objective lens in said focussing direction in said means for controlling said objective lens.

\* \* \* \* \*